United States Patent
Huang et al.

(10) Patent No.: US 9,668,117 B2
(45) Date of Patent: May 30, 2017

(54) METHOD AND DEVICE FOR ANALYZING SOCIAL RELATIONSHIP

(71) Applicant: Xiaomi Inc., Beijing (CN)

(72) Inventors: Hucheng Huang, Beijing (CN); Haibin Weng, Beijing (CN); Hui Geng, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/065,839

(22) Filed: Mar. 9, 2016

(65) Prior Publication Data

US 2017/0064526 A1    Mar. 2, 2017

(30) Foreign Application Priority Data

Aug. 24, 2015  (CN) .......................... 2015 1 0524653

(51) Int. Cl.
| | |
|---|---|
| *H04M 11/00* | (2006.01) |
| *H04W 4/20* | (2009.01) |
| *G06Q 50/00* | (2012.01) |
| *H04M 15/00* | (2006.01) |
| *H04W 4/00* | (2009.01) |
| *H04W 4/02* | (2009.01) |
| *H04W 8/18* | (2009.01) |

(52) U.S. Cl.
CPC ............ *H04W 4/206* (2013.01); *G06Q 50/01* (2013.01); *H04M 15/58* (2013.01); *H04W 4/008* (2013.01); *H04W 4/023* (2013.01); *H04W 8/183* (2013.01)

(58) Field of Classification Search
CPC ..... H04W 4/206; H04W 4/023; H04W 8/183; H04W 4/008; H04M 15/58; G06Q 50/01
See application file for complete search history.

(56) References Cited

U.S. PATENT DOCUMENTS

| | | | |
|---|---|---|---|
| 2006/0195785 | A1 | 8/2006 | Portnoy |
| 2010/0130128 | A1 | 5/2010 | Liao |
| 2011/0035673 | A1 | 2/2011 | Chou |
| 2012/0066053 | A1* | 3/2012 | Agarwal ............... G06Q 30/02 705/14.41 |

(Continued)

FOREIGN PATENT DOCUMENTS

| | | |
|---|---|---|
| CN | 102780514 A | 11/2012 |
| CN | 104636439 A | 5/2015 |

(Continued)

OTHER PUBLICATIONS

Supplementary European Search Report in European application No. 16160430.1, mailed on May 4, 2016.

(Continued)

*Primary Examiner* — Ajit Patel
(74) *Attorney, Agent, or Firm* — Jun He Law Offices P.C.; James J. Zhu

(57) ABSTRACT

Embodiments herein provide a method and device for analyzing a social relationship. The method includes: acquiring at least one target interaction parameter pertaining to an interaction between the first electronic device and a second electronic device; and determining a ranking value of a social relationship between a first user of the first electronic device and a second user of the second electronic device according to the at least one target interaction parameter.

15 Claims, 6 Drawing Sheets

(56) References Cited

U.S. PATENT DOCUMENTS

| | | | | |
|---|---|---|---|---|
| 2012/0117581 A1* | 5/2012 | Curtis | ............ | H04N 5/76 |
| | | | | 725/9 |
| 2012/0135690 A1 | 5/2012 | Liao | | |
| 2012/0281686 A1* | 11/2012 | Pollari | ............ | G06Q 30/02 |
| | | | | 370/338 |
| 2013/0024447 A1* | 1/2013 | Leng | ............ | G06Q 50/01 |
| | | | | 707/724 |
| 2014/0306994 A1 | 10/2014 | Brown | | |
| 2014/0372362 A1* | 12/2014 | Miller | ............ | G06F 17/00 |
| | | | | 706/50 |
| 2015/0234939 A1 | 8/2015 | Aharony et al. | | |
| 2016/0021152 A1* | 1/2016 | Maguire | ............ | H04L 65/403 |
| | | | | 709/204 |

FOREIGN PATENT DOCUMENTS

| | | |
|---|---|---|
| CN | 105096144 A | 11/2015 |
| WO | 2010088701 A1 | 8/2010 |

OTHER PUBLICATIONS

International Search Report in international application No. PCT/CN2015/100011, mailed on May 23, 2016.

\* cited by examiner

METHOD AND DEVICE FOR ANALYZING SOCIAL RELATIONSHIP

CROSS-REFERENCE TO RELATED APPLICATIONS

This application claims priority to Chinese patent application 201510524653.4 filed on Aug. 24, 2015, the entire content of which is incorporated herein by reference.

TECHNICAL FIELD

The present disclosure generally relates to the field of information technology, and in particular, to a method and device for analyzing a social relationship.

BACKGROUND

With flourish of information and communication technology and a trend of lighter, thinner, shorter, smaller electronic device, a user often carries an electronic device, such as a mobile phone, a wristband, and/or the like. Therefore, an inter-user social relationship may be analyzed based on an electronic device carried by the user.

Due to complexity in social relationship simulation, in related art, in general other users as a social group may be pre-defined by a user, and then data on social relationship analysis may be generated by pairing the electronic device carried by the user and electronic devices of another users in the same social group. However, such an analyzing method is relatively simple and the analyzed result may be inaccurate.

SUMMARY

According to a first aspect herein, a method for analyzing a social relationship includes: acquiring at least one target interaction parameter pertaining to an interaction between the first electronic device and a second electronic device; and determining a ranking value of a social relationship between a first user of the first electronic device and a second user of the second electronic device according to the at least one target interaction parameter.

According to a second aspect herein, a first electronic device for analyzing a social relationship includes: a processor; and a memory configured for storing an instruction executable by the processor. The processor is configured to perform: acquiring at least one target interaction parameter pertaining to an interaction between the first electronic device and a second electronic device; and determining a ranking value of a social relationship between a first user of the first electronic device and a second user of the second electronic device according to the at least one target interaction parameter.

According to a third aspect herein, a non-transitory computer-readable storage medium has stored therein instructions that, when executed by a processor, causes the processor to perform the method for analyzing a social relationship.

Note that the general description above and detailed description below are exemplary and explanatory only, and are not intended for limiting the present disclosure.

BRIEF DESCRIPTION OF THE DRAWINGS

Accompanying drawings herein are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. In drawing-related description below, unless indicated otherwise, identical references in different drawings represent identical or like elements. Implementations in the following exemplary embodiments do not represent all implementations according to the disclosure. On the contrary, they are merely examples of devices and methods according to some aspects of the disclosure as recited in the appended claims.

A term used in an embodiment herein is merely for describing the embodiment instead of limiting the present disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining".

Figure 1:
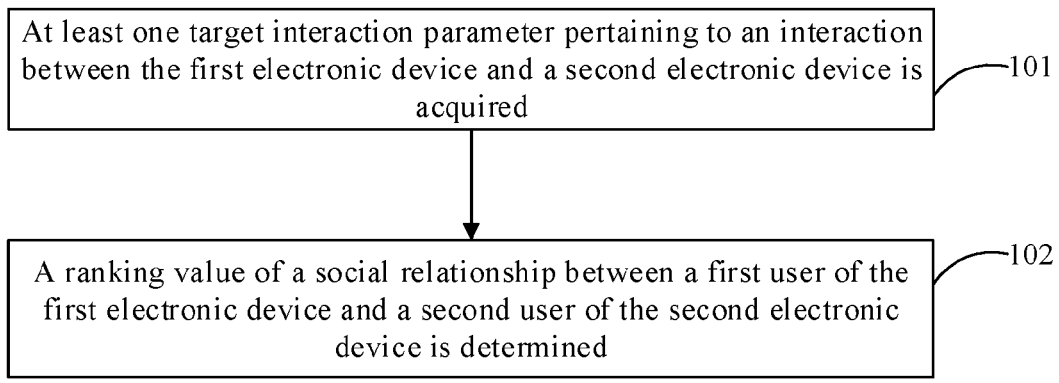
FIG. 1 is a flowchart of a method for analyzing a social relationship according to an exemplary embodiment herein.

FIG. 1 is a flowchart of a method for analyzing a social relationship according to an exemplary embodiment. As shown in FIG. 1, the method includes steps as follows.

In step 101, at least one target interaction parameter pertaining to an interaction between the first electronic device and a second electronic device is acquired.

The first and second electronic device involved in an embodiment herein may be various smart terminals, such as a smart mobile phone, a tablet computer, a Personal Digital Assistant (PDA), and/or the like. In the embodiment, the method is implemented by the first electronic device. However, the technician in the art can understand that the method can also be implemented by the second electronic device.

Figure 2:
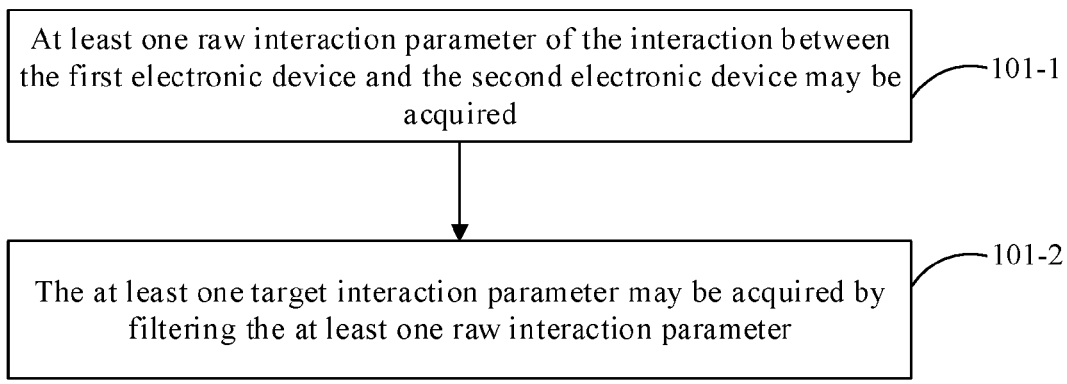
FIG. 2 is a flowchart of a method for analyzing a social relationship according to an exemplary embodiment herein.

FIG. 2 is a flowchart of a method for analyzing a social relationship according to an exemplary embodiment. As shown in FIG. 2, in step 101, the at least one target interaction parameter of the interaction may be acquired as follows.

In step 101-1, at least one raw interaction parameter of the interaction between the first electronic device and the second electronic device may be acquired.

In this step, the at least one raw interaction parameter of the interaction between the two electronic devices is acquired. Optionally, the at least one raw interaction parameter may be at least one of an interaction signal strength, an interaction distance, and an interaction duration. The at least one raw interaction parameter may be acquired as follows.

<Procedures of Acquiring the Interaction Signal Strength>

Optionally in an embodiment herein, the interaction signal strength may be a strength of a Bluetooth signal when the two electronic devices communicate by Bluetooth.

The first electronic device may first establish a Bluetooth connection with the second electronic device, and then acquire the strength of the Bluetooth signal between the two electronic devices according to related art. The acquired strength of the Bluetooth signal may further be taken as the interaction signal strength.

<Procedure of Acquiring the Interaction Distance>

In an embodiment herein, the interaction distance may be acquired in either one of two modes as follows.

<Mode 1>

After the strength of the Bluetooth signal between the first electronic device and the second electronic device has been acquired, the interaction distance between the two electronic devices may be determined according to the strength of the Bluetooth signal.

According to related art, the shorter a distance between two electronic devices is, the greater a strength of a Bluetooth signal thereof will be; and the greater the distance is, the less the strength of the Bluetooth signal will be. Therefore, in an embodiment herein, the interaction distance between the first electronic device and the second electronic device may be determined according to the acquired strength of the Bluetooth signal between the two electronic devices.

<Mode 2>

The interaction distance may be finally determined using a Global Positioning System (GPS) module installed on each of the two electronic devices.

According to related art, information of a first position of the first electronic device may be acquired using the GPS module installed of the first electronic device. For example, information of latitude and longitude of the first electronic device may be acquired.

Likewise according to related art, the second electronic device may acquire information of a second position of the second electronic device using the GPS module installed thereon. Optionally, the information of the second position may then be sent to the first electronic device via the Bluetooth connection established between the two electronic devices.

After acquiring the information of the first position and receiving the information of the second position, the first electronic device may compute the distance between the two electronic devices according to related art. The computed distance may be set as the interaction distance.

<Procedure of Acquiring the Interaction Duration>

According to an embodiment herein, similarly, the interaction duration may be determined in either one of two modes as follows.

<Mode 1>

As a Bluetooth connection between the first electronic device and the second electronic device has been established, the duration of communication between the two electronic devices via Bluetooth may directly be set as the interaction duration.

<Mode 2>

After a call between the two electronic devices has been made, the duration of the call may be set as the interaction duration. In an embodiment herein, the duration of the call may be a duration generated by a traditional phone call service between the two electronic devices, or a duration generated by a video call or voice call APP between the two electronic devices.

In an embodiment herein, one or more of an interaction signal strength, an interaction distance, and an interaction duration may be acquired by the mode described above.

In step 101-2, the at least one target interaction parameter may be acquired by filtering the at least one raw interaction parameter.

In the step, optionally, after the at least one raw interaction parameter has been acquired, the at least one raw interaction parameter may be purified according to related art to remove interfering information thereof, then be denoised according to related art to remove noise therein, and finally be normalized according to related art to acquire the at least one target interaction parameter. Purifying, denoising and normalizing algorithm presented in the present disclosure can include traditional and/or proprietary purifying, denoising and normalizing algorithm.

In step 102, a ranking value of a social relationship between a first user of the first electronic device and a second user of the second electronic device is determined according to the target interaction information.

In this step, optionally, the first electronic device may determine, using the target interaction information, a close social relationship between the users of the two electronic devices. The target interaction information may include one or more of a target interaction signal strength, a target interaction distance, and a target interaction duration. A close social relationship may be analyzed for various kinds of target interaction information as follows.

<Procedure of Determining a Close Social Relationship According to the Target Interaction Signal Strength>

When a target interaction signal strength exceeds a preset strength, it may be determined that the social relationship is a close social relationship.

In general, the closer the two electronic devices is in location, the greater the target interaction signal strength will be. When the target interaction signal strength exceeds the preset strength, the first electronic device may determine that the users of the two electronic devices are in a close social relationship.

<Procedure of Determining a Close Social Relationship According to the Target Interaction Distance>

Likewise, the less the target interaction distance is, the closer the two electronic devices is in location. When the target interaction distance is less than a preset distance, the first electronic device may determine that the users of the two electronic devices are in a close social relationship.

<Procedure of Determining a Close Social Relationship According to the Target Interaction Duration>

The greater the target interaction duration between the two electronic devices is, the closer the relationship between the users of the two electronic devices may be. When the target interaction duration exceeds a preset duration, the first electronic device may determine that the users of the two electronic devices are in a close social relationship.

In a real application, the first electronic device may analyze the social relationship between the users of the two electronic devices according to multiple kinds of target interaction parameters to increase accuracy of the analysis. For example, when the target interaction signal strength exceeds a preset strength and the target interaction duration exceeds a preset duration, it may be determined that the social relationship between the users of the two electronic devices are in a close social relationship.

In an embodiment herein, based on the at least one target interaction parameter, it may be determined not only whether the users of the two electronic devices are in a close social relationship, but also whether the users are in a relatively fixed common social relationship, such as a relationship between colleagues. Optionally, a multiple of target interaction parameters may be acquired. When the multiple of target interaction distances are close to each other, and the multiple of target interaction signal strengths are close to each other, it may be determined that the social relationship between the users of the two electronic devices are in a fixed common social relationship.

Of course, if the at least one target interaction parameter acquired in different times is randomly distributed, or it is the first time the at least one target interaction parameter is acquired, according to the embodiments herein, it may be determined that the social relationship between the users of the two electronic devices is a stranger relationship.

In an embodiment herein, after the social relationship between the first user of the first electronic device and the second user of the second electronic device has been determined, the social relationship may further be applied in an APP. That is, the method may further include a step as follows (not shown in FIG. 1).

In step 103, the ranking value of the social relationship may be represented to the first user by an APP.

After the users have established an association using an APP on the electronic device, in this step, the determined ranking value of the social relationship may be represented to the first user. For example, when the users are determined to be in a close social relationship, an indication of close relationship may be provided. When the users are strangers to each other, an indication of making friends may be provided.

In the embodiment, the first electronic device may automatically acquire the at least one target interaction parameter associated with the second electronic device, and then the first electronic device may determine, according to the at least one target interaction parameter, the social relationship between the users. Qualitative analysis made based on user carried electronic device may produce a relatively accurate result. After determining the social relationship between the users, an indication of the social relationship may be provided by an APP, which improves user experience.

Figure 3:
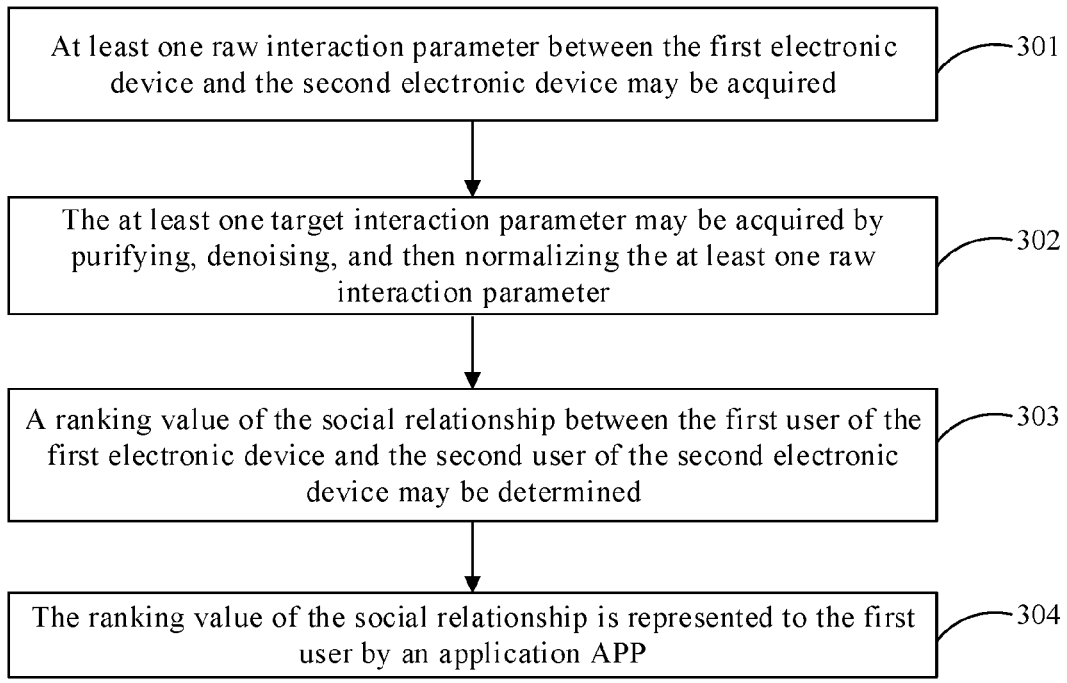
FIG. 3 is a flowchart of a method for analyzing a social relationship according to an exemplary embodiment herein.

FIG. 3 is a flowchart of a method for analyzing a social relationship according to an exemplary embodiment. As shown in FIG. 3, the method may include steps as follows.

In step 301, at least one raw interaction parameter between the first electronic device and the second electronic device may be acquired.

In the step, the at least one raw interaction parameter between the two electronic devices is to be acquired. Optionally, the at least one raw interaction parameter may be at least one of an interaction signal strength, an interaction distance, and an interaction duration. The interaction signal strength may be a strength of a Bluetooth signal when the two electronic devices communicate by Bluetooth.

The interaction distance may be acquired in either one of two modes as follows.

<Mode 1>

The interaction distance between the two electronic devices may be determined according to the acquired strength of the Bluetooth signal.

Optionally in an embodiment herein, a correspondence between a strength of a Bluetooth signal and an interaction distance may be provided, as shown in Table 1.

TABLE 1

| Strength of Bluetooth signal | Interaction distance |
|---|---|
| P1 | S1 |
| P2 | S2 |
| P3 | S3 |

In a real application, even distance between the two electronic devices is the same, due to different factors such as an environmental factor, the acquired strength of the Bluetooth signal between the two electronic devices may vary. Therefore, the strength of the Bluetooth signal in Table 1 may fall into a range, as shown in Table 2.

TABLE 2

| Strength of Bluetooth signal | Interaction distance |
|---|---|
| P1-P4 | S1 |
| P2-P5 | S2 |
| P3-P6 | S3 |

In Table 2, a strength of the Bluetooth signal within the range of P1-P4 may correspond to an interaction distance S1 between the two electronic devices.

According to a correspondence in Table 1 or Table 2, once the strength of the Bluetooth signal between the two electronic devices is acquired, the interaction distance between the first electronic device and the second electronic device may be determined.

<Mode 2>

The interaction distance may be determined by respectively acquiring information of positions of the two electronic devices via GPS modules installed on them.

The information of the positions of the two electronic devices may be latitude and longitude, or distances with respect to a same reference.

Likewise, the interaction duration may be determined in either one of two modes as follows.

<Mode 1>

As a Bluetooth connection between the first electronic device and the second electronic device has been established, the communication duration of the communication between the two electronic devices via Bluetooth may directly be set as the interaction duration.

After establishing a Bluetooth connection with the second electronic device, the first electronic device may start a timer. When the Bluetooth communication completes, the first electronic device may stop the timer and read a timing duration of the timer as the interaction duration.

<Mode 2>

After a call between the two electronic devices has been made, the duration of the call may be set as the interaction duration. In an embodiment herein, the duration of the call may be a duration generated by a traditional phone call service between the two electronic devices, or a duration generated by a video call or a voice call via an APP between the two electronic devices.

The first electronic device may directly read the duration of the call with the second electronic device in the call record as the interaction duration. Alternatively, the first electronic device may read a duration of a voice chat with the second electronic device via a voice call APP, such as WeChat APP installed on the first electronic device, as the interaction duration.

In an embodiment herein, one or more of an interaction signal strength, an interaction distance, and an interaction duration may be acquired by means of the modes described above.

In step 302, the at least one target interaction parameter may be acquired by purifying, denoising, and then normalizing the at least one raw interaction parameter.

In the step, after the at least one raw interaction parameter has been acquired, the at least one raw interaction parameter may be filtered and denoised according to related art to remove interfering information, noise, and/or the like thereof, thereby acquiring the at least one target interaction parameter.

In step 303, a ranking value of the social relationship between the first user of the first electronic device and the second user of the second electronic device may be determined according to the at least one target interaction parameter.

In this step, optionally, the first electronic device may determine, using the at least one target interaction parameter, a close social relationship between the users of the two electronic devices. The at least one target interaction parameter may include one or more of a target interaction signal strength, a target interaction distance, and a target interaction duration. The social relationship between the users may be determined to be either a close social relationship, a common social relationship, or a stranger social relationship according to the aforementioned method.

In step 304, the ranking value of the social relationship is represented to the first user by an application APP.

In this step, the determined social relationship is indicated by an APP installed on the electronic device.

For example, when determining that the first user and the second are in a close social relationship, after the first user has logged in to a payment transaction APP on the first electronic device, the payment transaction APP may prompt the first user of a close relationship with the second user, and that an operation such as account binding may be performed.

Alternatively, when determining that the first user and the second user are strangers to each other, after the first user has logged in to a real-time chat APP on the first electronic device, the real-time chat APP may prompt the first user to make a friend with the unfamiliar second user.

In the embodiment, the first electronic device may automatically acquire the at least one raw interaction parameter with the second electronic device, acquire the at least one target interaction parameter by purifying, denoising, and then normalizing the at least one raw interaction parameter. Then, the first electronic device may determine, according to the at least one target interaction parameter, the inter-user social relationship. The social relationship may be indicated by an APP after the social relationship between the users are determined based on qualitative analysis, which improves user experience.

Corresponding to the methods for analyzing a social relationship according to the aforementioned embodiments, apparatuses for analyzing a social relationship are further provided in the present disclosure.

Figure 4:
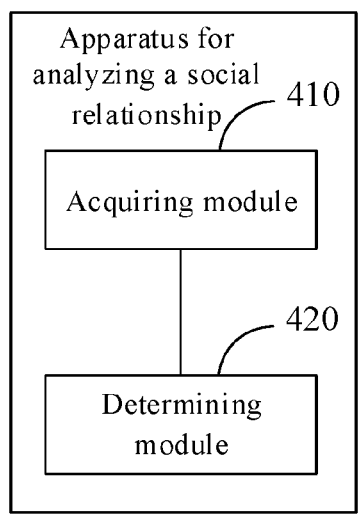
FIG. 4 is a block diagram of an apparatus for analyzing a social relationship according to an exemplary embodiment herein.

FIG. 4 is a block diagram of an apparatus for analyzing a social relationship according to an exemplary embodiment herein. The apparatus may be implement in a first electronic device and/or a second electronic device. As shown in FIG. 4, the apparatus includes an acquiring module 410 and a determining module 420.

The acquiring module 410 is configured for acquiring at least one target interaction parameter between the first electronic device and the second electronic device.

The determining module 420 is configured for determining a social relationship between a first user of the first electronic device and a second user of the second electronic device according to the at least one target interaction parameter acquired by the acquiring module.

In the embodiment, the first electronic device may automatically acquire the at least one target interaction parameter with the second electronic device, and then the first electronic device may determine, according to the at least one target interaction parameter, the inter-user social relationship. Qualitative analysis made based on user carried electronic device may produce a relatively accurate result.

Figure 5:
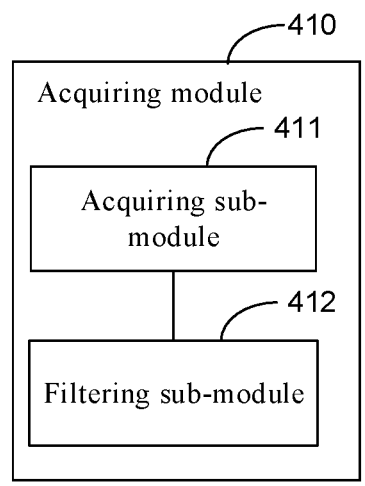
FIG. 5 is a block diagram of an apparatus for analyzing a social relationship according to an exemplary embodiment herein.

FIG. 5 is a block diagram of an apparatus for analyzing a social relationship according to an exemplary embodiment herein. As shown in FIG. 5, according to an embodiment, based on the embodiment as shown in FIG. 4, the acquiring module 410 may include an acquiring sub-module 411 and a filtering sub-module 412.

The acquiring sub-module 411 may be configured for acquiring at least one raw interaction parameter between the first electronic device and the second electronic device.

The filtering sub-module 412 may be configured for acquiring the at least one target interaction parameter by filtering the at least one raw interaction parameter acquired by the acquiring sub-module.

The at least one raw interaction parameter may include at least one of: an interaction signal strength, an interaction distance, and an interaction duration.

In the embodiment, the at least one raw interaction parameter between the two electronic devices may be acquired first. The at least one raw interaction parameter may be filtered to remove useless information thereof. Then the inter-user social relationship may be determined according to the filtered at least one target interaction parameter, thereby ensuring accuracy of the analysis.

In the embodiment, the interaction signal strength may be a strength of a Bluetooth signal.

Figure 6:
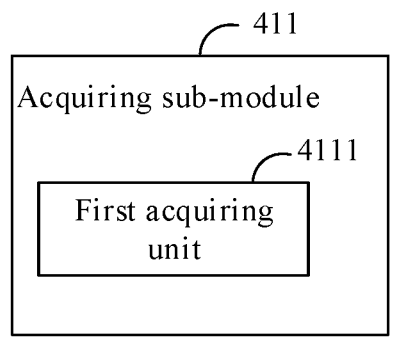
FIG. 6 is a block diagram of an apparatus for analyzing a social relationship according to an exemplary embodiment herein.

FIG. 6 is a block diagram of an apparatus for analyzing a social relationship according to another exemplary embodiment herein. As shown in FIG. 6, according to an embodiment, based on the embodiment as shown in FIG. 5, the acquiring sub-module 411 may include a first acquiring unit 4111.

The first acquiring unit 4111 may be configured for acquiring the interaction distance base on the strength of the Bluetooth signal.

In the embodiment, when the strength of the Bluetooth signal between the two electronic devices is acquired, the interaction distance between the two electronic devices may be determined directly according to the strength of the Bluetooth signal, facilitating subsequent qualitative analysis of the inter-user social relationship and improving user experience.

Figure 7A:
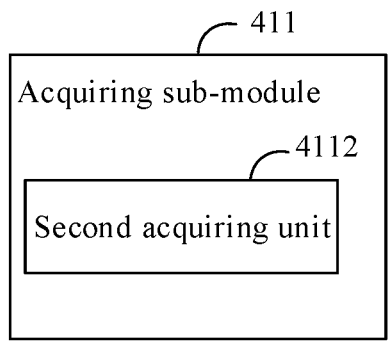
FIG. 7A-7B are each a block diagram of an apparatus for analyzing a social relationship according to an exemplary embodiment herein.

FIG. 7A is a block diagram of an apparatus for analyzing a social relationship according to an exemplary embodiment herein. As shown in FIG. 7A, according to an embodiment, based on the embodiment as shown in FIG. 5, the acquiring sub-module 411 may include a second acquiring unit 4112.

The second acquiring unit 4112 may be configured for acquiring a communication duration of communication between the first electronic device and the second electronic device by Bluetooth, and setting the determined communication duration as the interaction duration.

Figure 7B:
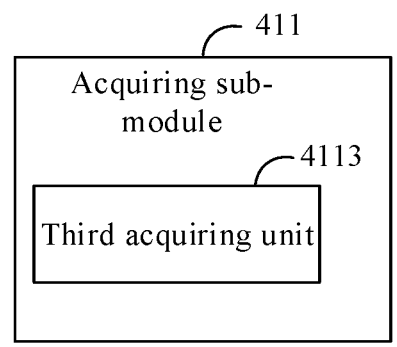

Alternatively, FIG. 7B is a block diagram of a device for analyzing a social relationship according to an exemplary embodiment herein. As shown in FIG. 7B, according to an embodiment, based on the embodiment as shown in FIG. 5, the acquiring sub-module 411 may include a third acquiring unit 4113.

The third acquiring unit 4113 may be configured for acquiring a duration of a call between the first electronic device and the second electronic device, and setting the determined duration of the call as the interaction duration.

In the embodiment, a raw interaction duration may be set as the communication duration of Bluetooth communication between the two electronic devices or the duration of the call between the two electronic devices, ensuring subsequent qualitative analysis of the inter-user social relationship and improving user experience.

Figure 8:
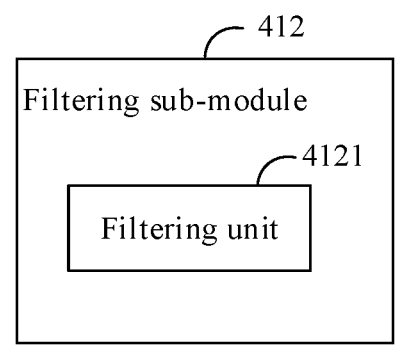
FIG. 8 is a block diagram of an apparatus for analyzing a social relationship according to an exemplary embodiment herein.

FIG. 8 is a block diagram of an apparatus for analyzing a social relationship according to an exemplary embodiment herein. As shown in FIG. 8, according to an embodiment, based on the embodiment as shown in FIG. 5, the filtering sub-module 412 may include a filtering unit 4121.

The filtering unit 4121 may be configured for acquiring the at least one target interaction parameter by purifying, denoising, and then normalizing the at least one raw interaction parameter acquired by the acquiring sub-module.

In the embodiment, the at least one raw interaction parameter has to be filtered to remove useless information, ensuring accuracy of subsequent qualitative analysis of the inter-user social relationship.

Figure 9:
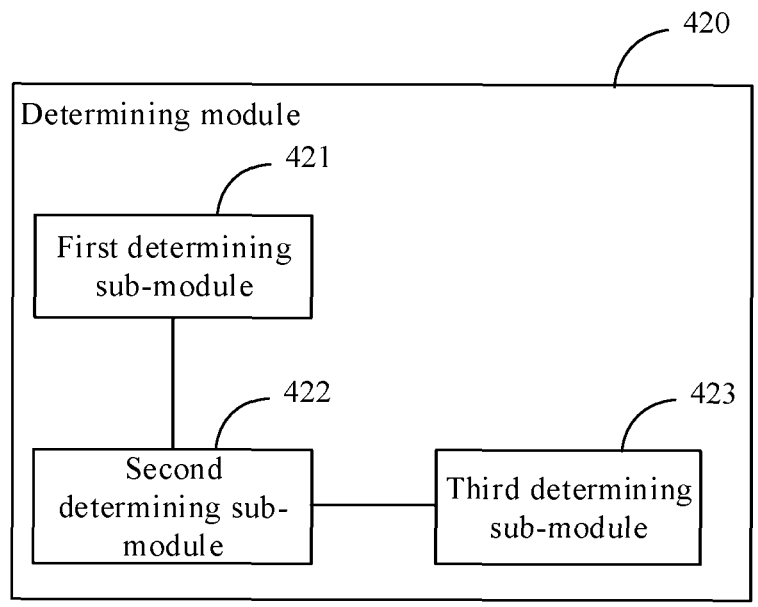
FIG. 9 is a block diagram of an apparatus for analyzing a social relationship according to an exemplary embodiment herein.

FIG. 9 is a block diagram of an apparatus for analyzing a social relationship according to an exemplary embodiment herein. As shown in FIG. 9, according to an embodiment, based on the embodiment as shown in FIG. 5, the determining module 420 may include at least one of a first determining sub-module 421, a second determining sub-module 422, and a third determining sub-module 423.

The first determining sub-module 421 may be configured for: when a target interaction signal strength in the at least one target interaction parameter acquired by the filtering sub-module exceeds a preset strength, determining that the social relationship is a close social relationship.

The second determining sub-module 422 may be configured for: when a target interaction distance in the target interaction information acquired by the filtering sub-module is less than a preset distance, determining that the social relationship is a close social relationship.

The third determining sub-module 423 may be configured for: when a target interaction duration in the at least one target interaction parameter acquired by the filtering sub-module exceeds a preset duration, determining that the social relationship is a close social relationship.

In the embodiment, when the target interaction signal strength exceeds the preset strength, and/or the target interaction distance is less than the preset distance, and/or the target interaction duration exceeds the preset duration, it may be qualitatively determined, with a relatively high accuracy, that the users of the two electronic devices are in a close social relationship, which improves user experience.

Figure 10:
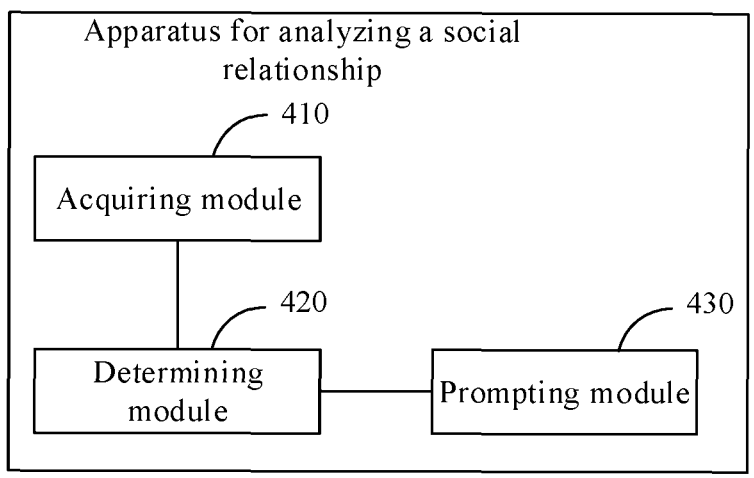
FIG. 10 is a block diagram of an apparatus for analyzing a social relationship according to an exemplary embodiment herein.

FIG. 10 is a block diagram of an apparatus for analyzing a social relationship according to an exemplary embodiment herein. As shown in FIG. 10, according to an embodiment, based on the embodiment as shown in FIG. 4, the apparatus may further include a prompting module 430.

The prompting module 430 may be configured to indicate the social relationship determined by the determining module by an APP.

In the embodiment, when the inter-user social relationship is qualitatively determined, an indication may further be provided by an APP, which improves user experience.

The way in which a module of the apparatus in an aforementioned embodiment executes an operation has been elaborated in an aforementioned embodiment of the method, and will not be elaborated here.

Correspondingly, a device for analyzing a social relationship is also provided in the present disclosure. The device includes: a processor and a memory configured for storing an instruction executable by the processor. The processor is configured for: acquiring at least one target interaction parameter between a first electronic device and a second electronic device; and determining a social relationship between a first user of the first electronic device and a second user of the second electronic device according to the at least one target interaction parameter.

Figure 11:
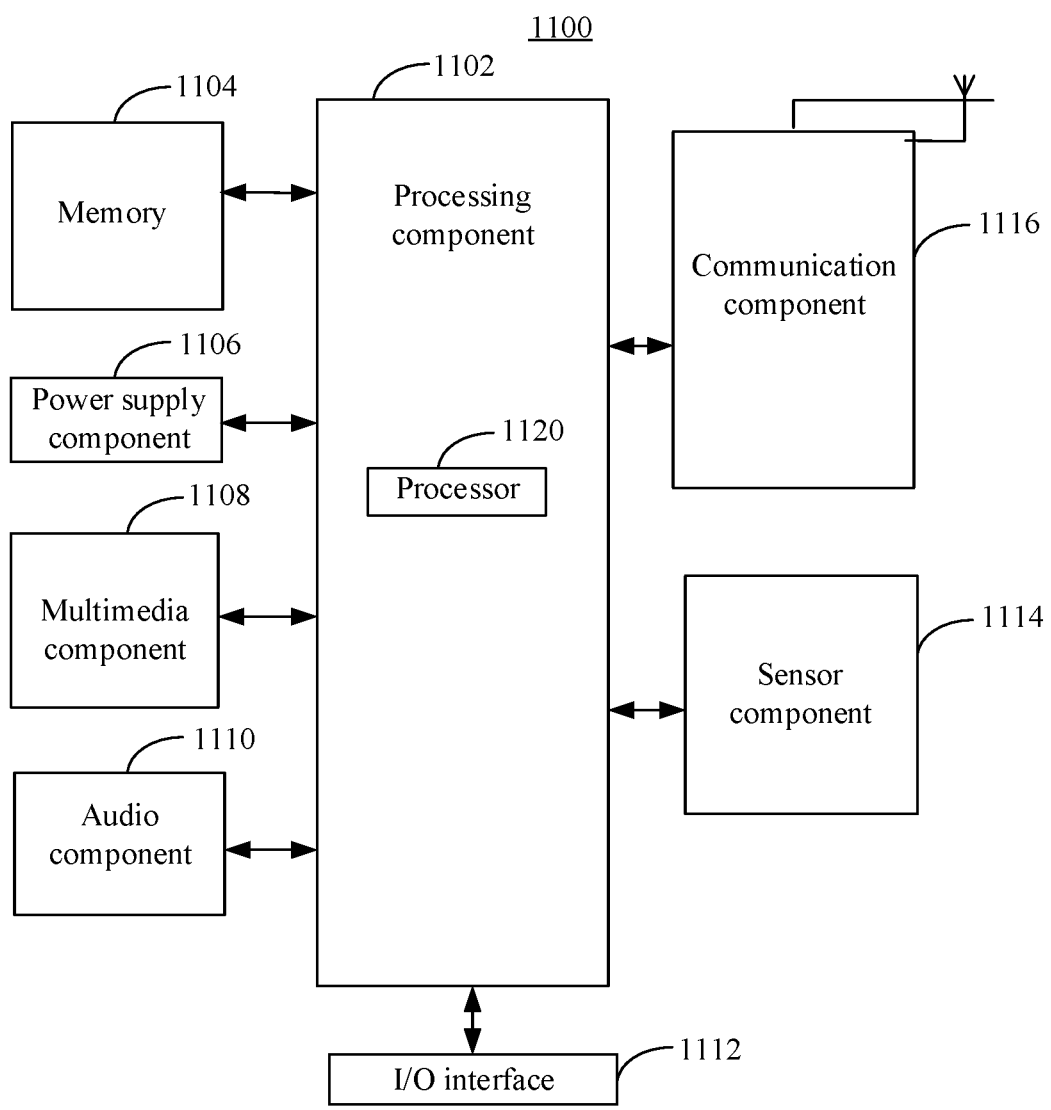
FIG. 11 is a diagram of a structure of a device for analyzing a social relationship according to an exemplary embodiment herein.

FIG. 11 is a diagram of a structure of a device 1100 for analyzing a social relationship according to an exemplary embodiment herein. For example, the device 1100 may be an electronic device such as a smart terminal. The terminal may be a mobile phone, a computer, a digital broadcasting terminal, a message transceiver, a smart socket, a smart sphygmomanometer, a game console, a tablet device, a medical device, a fitness device, a Personal Digital Assistant, and/or the like.

Referring to FIG. 11, the device 1100 may include one or more components as follows: a processing component 1102, a memory 1104, a power supply component 1106, a multimedia component 1108, an audio component 1110, an Input/Output (I/O) interface 1112, a sensor component 1114, and a communication component 1116.

The processing component 1102 generally controls an overall operation of the device 1100, such as operations associated with display, a telephone call, data communication, a camera operation, and a recording operation. The processing component 1102 may include one or more processors 1120 to execute instructions so as to complete all or some steps of the method. In addition, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 may be configured for storing various types of data to support the operation on the device 1100. Example of such data may include instructions of any application or method configured for operating on the device 1100, contact data, phonebook data, messages, pictures, videos, and/or the like. The memory 1104 may be realized by any type of volatile or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 1106 may supply electric power to various components of the device 1100. The power supply component 1106 may include a power management system, one or more power sources, and other components related to generating, managing and distributing electricity for the device 1100.

The multimedia component 1108 may include a screen providing an output interface between the device 1100 and a user. In some embodiments, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some embodiments, the multimedia component 1108 may include a front camera and/or a rear camera. When the device 1100 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 1110 may be configured for outputting and/or inputting an audio signal. For example, the audio component 1110 may include a microphone (MIC). When the device 1100 is in an operation mode such as a call mode, a recording mode, and a voice recognition mode, the MIC may be configured for receiving an external audio signal. The received audio signal may be further stored in the memory 1104 or may be sent via the communication component 1116. In some embodiments, the audio component 1110 may further include a loudspeaker configured for outputting the audio signal.

The I/O interface 1112 may provide an interface between the processing component 1102 and a peripheral interface module. Such a peripheral interface module may be a keypad, a click wheel, a button or the like. Such a button may include but is not limited to: a homepage button, a volume button, a start button, and a lock button.

The sensor component 1114 may include one or more sensors for assessing various states of the device 1100. For example, the sensor component 1114 may detect an on/off state of the device 1100 and relative positioning of components such as the display and the keypad of the device 1100. The sensor component 1114 may further detect a change in the position of the device 1100 or of a component of the device 1100, whether there is contact between the device 1100 and a user, the orientation or acceleration/deceleration of the device 1100, and a change in the temperature of the device 1100. The sensor component 1114 may include a proximity sensor configured for detecting existence of a nearby object without physical contact. The sensor component 1114 may further include an optical sensor such as a Complementary Metal-Oxide-Semiconductor (CMOS) or Charge-Coupled-Device (CCD) image sensor used in an imaging application. In some embodiments, the sensor component 1114 may further include an acceleration sensor, a gyroscope sensor, a magnetic sensor, a pressure sensor, a microwave sensor, or a temperature sensor.

The communication component 1116 may be configured for facilitating wired or wireless communication between the device 1100 and other device. The device 1100 may access a wireless network based on a communication standard such as WiFi, 2G or 3G, or combination thereof. In an exemplary embodiment, the communication component 1116 may receive a broadcast signal or broadcast related information from an external broadcast management system via a broadcast channel. In an exemplary embodiment, the communication component 1116 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and other technologies.

In an exemplary embodiment, the device 1100 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components to implement the method.

In an exemplary embodiment, a non-transitory computer-readable storage medium including instructions, such as a memory 1104 including instructions, may be provided. The instructions may be executed by the processor 1120 of the device 1100 to implement the method. For example, the non-transitory computer-readable storage medium may be a Read-Only Memory (ROM), a Compact Disc Read-Only Memory (CD-ROM), a magnetic tape, a floppy disk, optical data storage equipment, etc.

Other embodiments herein will be apparent to those skilled in the art from consideration of the specification and practice of the invention disclosed here. This application is intended to cover any variations, uses, or adaptations of the disclosure following the general principles thereof and including such departures from the present disclosure as come within known or customary practice in the art. The specification and the embodiments are intended to be exemplary only, with a true scope and spirit of the disclosure being indicated by the appended claims.

Note that the present disclosure is not limited to the exact construction that has been described above and illustrated in the accompanying drawings, and that various modifications and changes can be made without departing from the scope thereof. It is intended that the scope of the present disclosure be limited only by the appended claims.

INDUSTRIAL APPLICABILITY

In an embodiment herein, the first electronic device may automatically acquire the at least one target interaction parameter with the second electronic device, and then the first electronic device may determine a social relationship between a first user of the first electronic device and a second user of the second electronic device according to the at least one target interaction parameter. Qualitative analysis made based on user carried electronic device may produce a relatively accurate result.

In an embodiment herein, qualitative analysis may be performed on the inter-user social relationship according to an interaction signal strength, an interaction distance, and an interaction duration, improving user experience.

In an embodiment herein, the signal strength may be set as the strength of the Bluetooth signal between the two electronic devices; the interaction distance may be determined using the strength of the Bluetooth signal; alternatively, information on positions of the two electronic devices may be acquired respectively using GPS modules, and then the interaction distance may be computed according to the information on the positions; the interaction duration may be determined according to the communication duration of communication between the electronic devices by Bluetooth, or according to the duration of a call between the electronic devices, ensuring accuracy of qualitative analysis of the inter-user social relationship based on the carry-on electronic device.

In an embodiment herein, when the target interaction signal strength exceeds the preset strength, and/or the target distance is less than the preset distance, and/or the target interaction duration exceeds the preset duration, it may be qualitatively analyzed, with a relatively high accuracy, that the users of the two electronic devices are in a close social relationship, thereby improving user experience.

In an embodiment herein, the inter-user social relationship determined by the qualitative analysis may be represented to the first user by an APP with, thereby improving user experience.

What is claimed is:

1. A method for analyzing a social relationship by a first electronic device, comprising:
   acquiring at least one raw interaction parameter between the first electronic device and a second electronic device, wherein the at least one raw interaction parameter comprises at least one of an interaction signal strength, an interaction distance, and an interaction duration;
   acquiring at least one target interaction parameter by filtering noise from the at least one raw interaction parameter; and
   determining a ranking value of a social relationship between a first user of the first electronic device and a second user of the second electronic device according to the at least one target interaction parameter; wherein determining the ranking value comprises:
      when a target interaction signal strength exceeds a preset strength, determining that the social relationship is a close social relationship;
      when a target interaction distance is less than a preset distance, determining that the social relationship is a close social relationship; and
      when a target interaction duration exceeds a preset duration, determining that the social relationship is a close social relationship.

2. The method according to claim 1, wherein the interaction signal strength is a strength of a Bluetooth signal.

3. The method according to claim 2, wherein the interaction distance is acquired based on the strength of the Bluetooth signal.

4. The method according to claim 1, wherein the interaction duration is acquired by steps of:
   acquiring a communication duration of communication between the first electronic device and the second electronic device by Bluetooth, and setting the communication duration as the interaction duration; or
   acquiring a duration of a call between the first electronic device and the second electronic device, and setting the duration of the call as the interaction duration.

5. The method according to claim 1, wherein acquiring the at least one target interaction parameter by filtering noise from the at least one raw interaction parameter comprises:
   acquiring the at least one target interaction parameter by purifying, denoising, and then normalizing the at least one raw interaction parameter.

6. The method according to claim 1, after determining the ranking value, further comprising:
   representing the ranking value of the social relationship to the first user by an application APP.

7. A first electronic device for analyzing a social relationship, comprising:
   a processor; and
   a memory configured for storing an instruction executable by the processor,
   wherein the processor is configured to perform:
      acquiring at least one raw interaction parameter between the first electronic device and a second electronic device, wherein the at least one raw interaction parameter comprises at least one of an interaction signal strength, an interaction distance, and an interaction duration;
      acquiring at least one target interaction parameter by filtering noise from the at least one raw interaction parameter; and
      determining a ranking value of a social relationship between a first user of the first electronic device and a second user of the second electronic device according to the at least one target interaction parameter; wherein determining the ranking value comprises:
         when a target interaction signal strength exceeds a preset strength, determining that the social relationship is a close social relationship;
         when a target interaction distance is less than a preset distance, determining that the social relationship is a close social relationship; and
         when a target interaction duration exceeds a preset duration, determining that the social relationship is a close social relationship.

8. The first electronic device according to claim 7 wherein the interaction signal strength is a strength of a Bluetooth signal.

9. The first electronic device according to claim 8, wherein the interaction distance is acquired based on the strength of the Bluetooth signal.

10. The first electronic device according to claim 7, wherein the interaction duration is acquired by steps of:
    acquiring a communication duration of communication between the first electronic device and the second electronic device by Bluetooth, and setting the communication duration as the interaction duration; or
    acquiring a duration of a call between the first electronic device and the second electronic device, and setting the duration of the call as the interaction duration.

11. The first electronic device according to claim 7, wherein acquiring the at least one target interaction parameter by filtering noise from the at least one raw interaction parameter comprises:
    acquiring the at least one target interaction parameter by purifying, denoising, and then normalizing the at least one raw interaction parameter.

12. The first electronic device according to claim 7, wherein after determining the ranking value, the processor is further configured to perform:

representing the ranking value of the social relationship to the first user by an application APP.

13. A non-transitory computer-readable storage medium having stored therein instructions that, when executed by a processor, causes the processor to perform a method for analyzing a social relationship, the method comprising:
   acquiring at least one raw interaction parameter between the first electronic device and a second electronic device, wherein the at least one raw interaction parameter comprises at least one of an interaction signal strength, an interaction distance, and an interaction duration;
   acquiring at least one target interaction parameter by filtering noise from the at least one raw interaction parameter; and
   determining a ranking value of a social relationship between a first user of the first electronic device and a second user of the second electronic device according to the at least one target interaction parameter; wherein determining the ranking value comprises:
      when a target interaction signal strength exceeds a preset strength, determining that the social relationship is a close social relationship;
      when a target interaction distance is less than a preset distance, determining that the social relationship is a close social relationship; and
      when a target interaction duration exceeds a preset duration, determining that the social relationship is a close social relationship.

14. The storage medium according to claim 13, wherein the interaction signal strength is a strength of a Bluetooth signal.

15. The storage medium according to claim 14, wherein the interaction distance is acquired based on the strength of the Bluetooth signal.

* * * * *